(12) United States Patent
Gregorius

(10) Patent No.: US 11,294,345 B2
(45) Date of Patent: Apr. 5, 2022

(54) SAFETY SWITCHING APPARATUS

(71) Applicant: Phoenix Contact GmbH & Co. KG, Blomberg (DE)

(72) Inventor: Carsten Gregorius, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 141 days.

(21) Appl. No.: 16/074,902

(22) PCT Filed: Jan. 31, 2017

(86) PCT No.: PCT/EP2017/052047
§ 371 (c)(1),
(2) Date: Aug. 2, 2018

(87) PCT Pub. No.: WO2017/137279
PCT Pub. Date: Aug. 17, 2017

(65) Prior Publication Data
US 2019/0049911 A1    Feb. 14, 2019

(30) Foreign Application Priority Data
Feb. 8, 2016   (DE) ..................... 10 2016 102 150.4

(51) Int. Cl.
G05B 19/048   (2006.01)
G05B 9/02   (2006.01)
H01H 47/00   (2006.01)

(52) U.S. Cl.
CPC ............. *G05B 19/048* (2013.01); *G05B 9/02* (2013.01); *H01H 47/00* (2013.01); *H01H 47/001* (2013.01); *G05B 2219/25034* (2013.01)

(58) Field of Classification Search
CPC ........... G05B 9/02; G05B 9/00; G05B 19/048
(Continued)

(56) References Cited

U.S. PATENT DOCUMENTS 6,628,015 B2 *  9/2003  Pullmann .................. F16P 3/00
                                                                    307/326
7,130,171 B2 * 10/2006  Pullmann ................. G05B 9/03
                                                                      361/62

(Continued)

FOREIGN PATENT DOCUMENTS

CN          1521581 A       8/2004
CN          1577193 A       2/2005
(Continued)

*Primary Examiner* — Adi Amrany
(74) *Attorney, Agent, or Firm* — Holland & Hart LLP

(57) ABSTRACT

The disclosure relates to a modular safety switching apparatus for controlling a plurality of electrical devices, comprising: a first safety switching module comprising a first switching signal output configured to control a first electrical device; a second safety switching module comprising a second switching signal output configured to control a second electrical device; and a connection element configured to electrically connect the first safety switching module to the second safety switching module; wherein the second safety switching module is downstream in signal transmission to the first safety switching module, and wherein the first safety switching module is configured to be deactivated in response to receiving a first control signal and is further configured to feed a second control signal to the second safety switching module to deactivate the second safety switching module.

18 Claims, 2 Drawing Sheets

(58) Field of Classification Search
USPC .......................................................... 307/326
See application file for complete search history.

(56) References Cited

U.S. PATENT DOCUMENTS

| | | | |
|---|---|---|---|
| 7,242,116 B2* | 7/2007 | Kawazu | G05B 19/058 307/326 |
| 7,610,119 B2* | 10/2009 | Abe | G05B 19/0428 701/1 |
| 8,736,118 B2* | 5/2014 | Lorenz | G05B 19/0425 307/326 |
| 2003/0011250 A1* | 1/2003 | Pullmann | F16P 3/00 307/326 |
| 2003/0058602 A1 | 3/2003 | Veil | |
| 2003/0058623 A1 | 3/2003 | Veil et al. | |
| 2005/0010332 A1 | 1/2005 | Abe et al. | |
| 2008/0021573 A1 | 1/2008 | Grosser et al. | |
| 2009/0008232 A1* | 1/2009 | Dold | G05B 9/02 200/401 |
| 2009/0073628 A1 | 3/2009 | Nitsche et al. | |
| 2014/0168837 A1* | 6/2014 | Henneberger | G05B 23/0256 361/84 |

FOREIGN PATENT DOCUMENTS

| | | |
|---|---|---|
| CN | 101180698 A | 5/2008 |
| CN | 101208764 A | 6/2008 |
| CN | 101238536 A | 8/2008 |
| CN | 101395687 A | 3/2009 |
| CN | 102025582 A | 4/2011 |
| CN | 103797647 A | 5/2014 |
| CN | 104272420 A | 1/2015 |
| DE | 100 11 211 A1 | 9/2001 |
| DE | 100 20 075 A1 | 11/2001 |
| DE | 102011013720 A1 | 9/2012 |
| DE | 10 2012 110 698 B3 | 2/2014 |
| DE | 10 2013 111 179 A1 | 4/2015 |
| EP | 1936457 A1 | 6/2008 |
| WO | WO 2006/002725 A1 | 1/2006 |

* cited by examiner

SAFETY SWITCHING APPARATUS

CROSS-REFERENCE TO RELATED APPLICATIONS

This application is a 371 national phase filing of International Application No. PCT/EP2017/052047, entitled "SAFETY SWITCHING APPARATUS", filed 31 Jan. 2017, which claims priority to German Patent Application No. 10 2016 102 150.4, entitled "SICHERHEITSSCHALTVORRICHTUNG", filed 8 Feb. 2016.

BACKGROUND

The present disclosure relates to a safety switching apparatus for safely operating and controlling a plurality of electrical devices.

Safety relays and safety switching devices have great importance in different fields of application such as in monitoring the safety of electrical equipment and serve in particular in the monitoring of safety devices provided on machines and systems and in quickly and safely switching off electrical devices in an emergency.

A plurality of different safety relays and safety switching devices are known from the prior art such as, for example, single and dual channel variants for developing safety-related applications. An internal logic of a safety relay or safety switching device thereby usually monitors a safety circuit such as, for example, an emergency stop, safety guard, light barrier, two-hand control, etc., and activates a so-called enabling path in the error-free state in order to, for example, run an electrical device.

In the case of the safety function(s) of a safety relay or a safety switching device being activated, the enabling path of a safety relay or a safety switching device is deactivated, thus for example by the immediate switching off of the energy input or interrupting the energy input, i.e. the deactivating of the safety relay or the safety switching device, or the enabling path respectively, and the operation of the electrical device associated with the safety relay or safety switching device being stopped.

To safely operate a plurality of electrical devices, a corresponding plurality of safety relays or safety switching devices can be used which, however, generally operate independently of one another; i.e. the safety circuits defined by the respective safety relays or safety switching devices are not linked together. That can usually only be achieved by means of a complex programmable logic controller (PLC).

Using so-called contact extensions which are usually cross-wired to an existing safety relay or safety switching device to expand the functions of safety relays or safety switching devices in order to increase the outputs and thus be able to operate more electrical devices is known in the prior art. However, such a contact extension only follows the internal safety logic of the safety relay or safety switching device to which the contact extension is cross-wired.

In view of the above, the underlying object of the disclosure is to develop a concept for flexibly utilizing safety relays or safety switching devices in safely controlling electrical devices.

SUMMARY

This object is solved by the subject matter comprising the features according to the independent claims. Advantageous examples of the disclosure are the subject matter of the figures, the description and the dependent claims.

The disclosure is based on the realization that the above object can be solved by a modular safety switching apparatus which comprises at least two safety switching modules electrically connected to each other by a connection element such that one safety switching module is downstream of the other safety switching module in terms of signal transmission. In the sense of the present disclosure, "downstream in signal transmission" means that the safety logic of the safety switching module which is downstream in the signal transmission depends on the state of the other safety switching module.

Thus, the object is solved by a modular safety switching apparatus for controlling a plurality of electrical devices comprising: a first safety switching module with a first switching signal output for controlling a first electrical device; a second safety switching module with a second switching signal output for controlling a second electrical device; and a connection element which is configured to electrically connect the first safety switching module to the second safety switching module; wherein the second safety switching module is downstream in signal transmission to the first safety switching module, and wherein the first safety switching module can be deactivated in response to receiving a first control signal and is configured to feed a second control signal to the second safety switching module in order to deactivate the second safety switching module. The safety switching modules can thereby be configured as safety relays comprising relay outputs or as safety switching devices comprising semiconductor outputs.

This thereby provides a concept for flexibly utilizing safety relays or safety switching devices in safely controlling electrical devices. By virtue of the modular design to the safety switching apparatus, hierarchical protection concepts can be easily structured modularly by means of the safety switching modules without the need to laboriously "cross-link" the safety switching modules. Configuring the modular safety switching apparatus via software, switch or the like is not necessary.

According to one example, the modular safety switching apparatus comprises a third safety switching module comprising a third switching signal output for controlling a third electrical device and a further connection element which is configured to electrically connect the second safety switching module to the third safety switching module, and wherein the third safety switching module is downstream in signal transmission to the first safety switching module and the second safety switching module, and wherein the second safety switching module can be deactivated in response to receiving the second control signal or a third control signal and is configured to feed a fourth control signal to the third safety switching module in order to deactivate the third safety switching module.

This thereby achieves for example the advantage of being able to easily provide an arrangement of hierarchically interconnected safety switching modules.

According to one example, the modular safety switching apparatus comprises a support element, in particular a DIN rail, and the second safety switching module is arranged on the support element between the first safety switching module and the third safety switching module.

This thereby achieves for example the advantage of being able to easily install the modular safety switching apparatus, for example in a control cabinet.

According to one example, the connection element and the further connection element are arranged on the support element and the first safety switching module and the second safety switching module are detachably connected to the connection element and the second safety switching module and the third safety switching module are detachably connected to the further connection element.

This thereby achieves for example the advantage that the safety switching modules can be easily exchanged, for example in order to reconfigure the modular safety switching apparatus, i.e. redefine the dependency hierarchy of the safety switching modules by rearranging them on the DIN rail.

According to one example, the connection element is part of the first safety switching module or the second safety switching module and the further connection element is part of the second safety switching module or the third safety switching module.

According to one example, the second safety switching module or the third safety switching module is configured as a contact extension module.

In the example in which the third safety switching module is configured as a contact extension module, the contact extension module can be configured to feed a feedback signal to the second safety switching module via the further connection element and the second safety switching module is configured to feed the feedback signal to the first safety switching module via the connection element.

According to one example, the contact extension module comprises a contact bridge.

According to one example, the first safety switching module comprises a control signal output and the second safety switching module a control signal input and the connection element is configured to electrically connect the control signal output of the first safety switching module to the control signal input of the second safety switching module.

According to one example, the first safety switching module is configured to feed a switching signal fed to the first switching signal output to the control signal output of the first safety switching module as the second control signal and the second safety switching module is configured to feed a switching signal to the second switching signal output of the second safety switching module, which is based on the switching signal fed to the first switching signal output and a switching signal fed to a switching signal input of the second safety switching module.

According to one example, the second safety switching module comprises a safety logic element which is configured to link the switching signal fed to the first switching signal output to the switching signal fed to the switching signal input of the second safety switching module by means of a logical AND operation or a logical OR operation in order to generate the switching signal to be fed to the second switching signal output.

According to one example, the first control signal is physically of single-channel or dual-channel form.

According to one example, one of the safety switching modules, in particular the first safety switching module, comprises a power supply device in order to supply voltage to the safety switching modules of the modular safety switching apparatus.

According to one example, the power supply device comprises an external supply voltage input and an external reference voltage input.

According to one example, the connection element comprises a first and second internal supply voltage connection and a first and second internal reference voltage connection.

BRIEF DESCRIPTION OF THE DRAWINGS

Examples of the present disclosure are depicted in the drawings and will be described in greater detail in the following.

DETAILED DESCRIPTION

Figure 1:
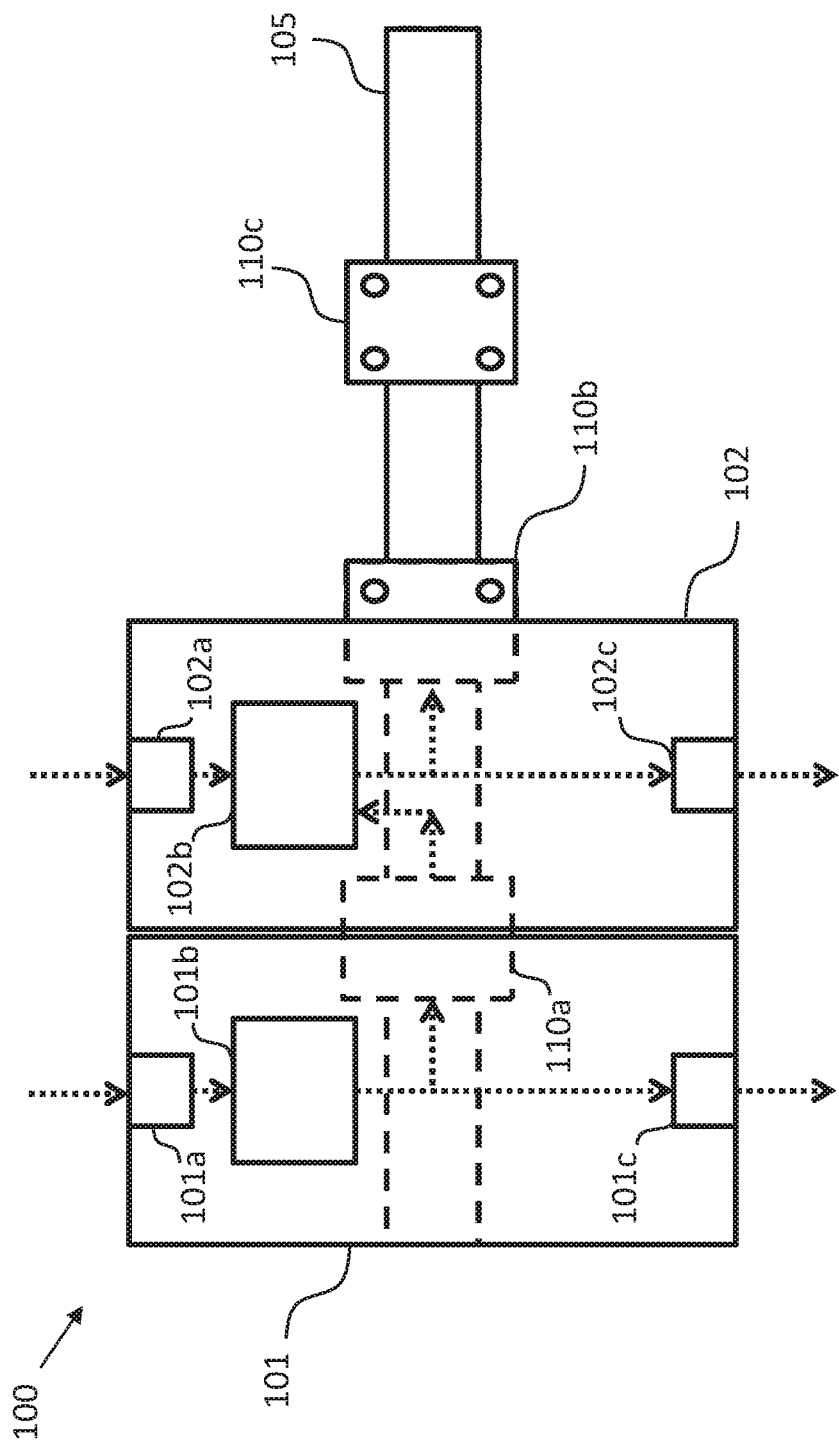
FIG. 1 shows a schematic diagram of a modular safety switching apparatus according to one example.

FIG. 1 shows a modular safety switching apparatus 100 according to one example. The modular safety switching apparatus 100 is configured to safety control or respectively operate a plurality of electrical devices which are, for example, part of an electrical system. For this purpose, the modular safety switching apparatus 100 comprises a first safety switching module 101 and a second safety switching module 102. The first safety switching module 101 and the second safety switching module 102 can thereby be configured as safety relays with relay outputs or as safety switching devices with semiconductor outputs.

In the example depicted in FIG. 1, the first safety switching module 101 comprises a switching signal input 101a, a safety logic element 101b and a switching signal output 101c. In the example depicted in FIG. 1, the second safety switching module 102 also comprises a switching signal input 102a, a safety logic element 102b and a switching signal output 102c. The switching signal input 101a can handle one or more safety circuits coupled with the safety logic element 101b. Upon a corresponding signal being fed to the switching signal input 101a, 102a, e.g. a signal from an "emergency stop" switch, the safety logic element 101b, 102b can feed a signal to the switching signal output 101b, 102b in order to, for example, switch off an electrical device connected to the switching signal output 101b, 102b, e.g. a drive mechanism.

The modular safety switching apparatus 100 further comprises a connection element 110a (obscured in the schematic diagram of FIG. 1 by the first safety switching module 101 and the second safety switching module 102), which is configured to electrically connect the first safety switching module 101 to the second safety switching module 102. The connection element 110a thereby electrically connects the first safety switching module 101 to the second safety switching module 102 such that the second safety switching module 102 is connected downstream of the first safety switching module 101 in terms of signal transmission. In other words: a signal of the first safety switching module 101 feeds to the safety logic element 102b of the second safety switching module 102b downstream in the signal transmission, as schematically indicated in FIG. 1 and to be described in more detail below.

As already described above, the first safety switching module 101 is configured to switch into in deactivated state in response to receiving a corresponding first control signal, e.g. a signal of an "emergency stop" button or switch, so as to, for example, switch off an electrical device connected to the switching signal output 101c. The first safety switching module 101 is thereby further configured to feed a second control signal to the second safety switching module 102 so as to deactivate the second safety switching module 102 and switch off the switching signal output 102c, as represented in FIG. 1 by the dotted arrows.

In other words: According to one example, along with the deactivation of the first safety switching module 101, the second safety switching module 102 is also deactivated, and that, according to one example, regardless of which signal is fed to the switching signal input 102a of the second safety switching module 102. In the case that the first safety switching module 101 is not deactivated, the second safety switching module 102 can thus be deactivated by a corresponding signal being fed to the switching signal input 102a of the second safety switching module 102, as already previously described. In this case, the switching signal output 101c of the first safety relay module 101 is not switched off.

In the example shown in FIG. 1, a second control signal to the second safety switching module 102 can be fed by the first safety switching module 101 via a control signal output of the first safety switching module 101 and a control signal input of the second safety switching module 102 which are connected to the corresponding contacts of the connection element 110a.

In the example depicted in FIG. 1, the switching signal fed to the switching signal output 101c of the first safety switching module 101 can also be fed to the connection element 110a and thus also to the control signal input of the second safety switching module 102. As already previously described above, in addition to the signal fed to the switching signal input 102a, this switching signal fed to the control signal input of the second safety switching module 102 represents a second control signal for the second safety switching module 102. On the basis of these two signals, the safety logic element 102b of the second safety switching module 102 generates a switching signal which is fed to the switching signal output 102c of the second safety switching module 102. The safety logic element 102b of the second safety relay module 102 can in particular be configured to link the two signals by means of a logical AND operation or a logical OR operation in order to generate the switching signal to be fed to the switching signal output 102c of the second safety switching module 102.

In other words: In the example depicted in FIG. 1, the first safety switching module 101 can be configured to also feed the switching signal fed to the first switching signal output 101c to the control signal output of the first safety switching module 101 as a second switching signal and the second safety switching module 102 can be configured to feed a switching signal to the switching signal output 102c of the second safety switching module 102 via the safety logic element 102b, the signal being based on the switching signal fed to the first switching signal output 101c, which corresponds to the second control signal, and a switching signal fed to the switching signal input 102a of the second safety switching module 102.

According to one example, the control signals can be physically of single-channel or dual-channel form.

In the example depicted in FIG. 1, the first safety switching module 101 is detachably connected to connection element 110a and the second safety switching module 102 is detachably connected to connection element 110a and to a further connection element 110b. In this regard, the connection element 110a and the further connection element 110b can be formed with contact pins as schematically indicated in FIG. 1 for the further connection element 110b, which can be introduced into corresponding contact sleeves on the respective lower side of the first safety switching module 101 and the second safety switching module 102.

Figure 2:
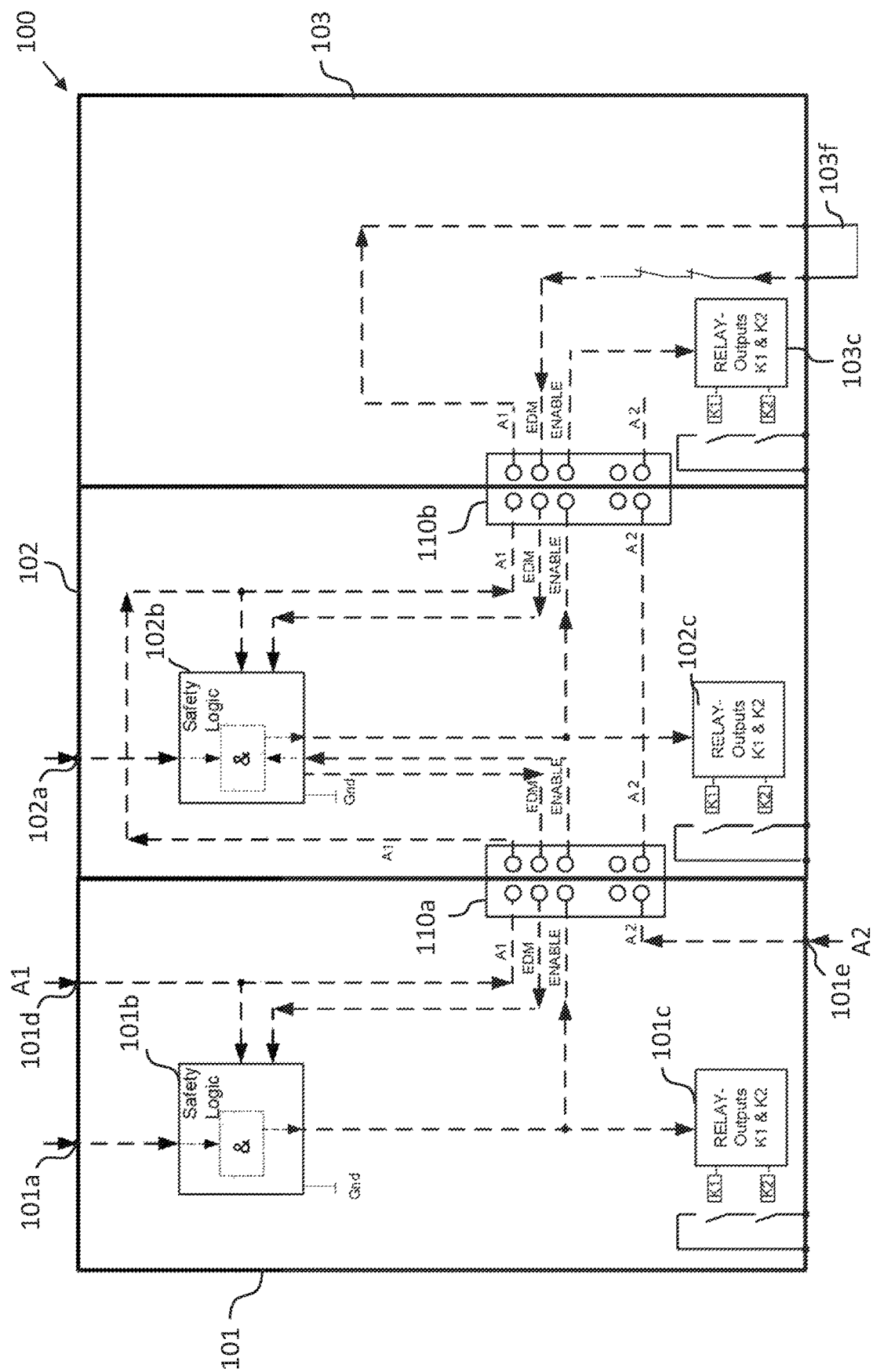
FIG. 2 shows a schematic diagram of a modular safety switching apparatus according to a further example.

The connection element 110a and the further connection element 110b can in turn be attached or mounted to a support element, in particular a DIN rail 105. As FIG. 1 shows, the DIN rail 105 can be configured with at least one further connection element 110c in order to provide slots for further safety switching modules on the DIN rail 105. e.g. for a third safety switching module 103 as depicted in FIG. 2 for controlling a third electrical device.

According to one example, the connection element 110a can also be part of the first safety switching module 101 or the second safety switching module 102 and the further connection element 110b can be part of the second safety switching module 102. For example, in the example depicted in FIG. 1, a third safety switching module 103 which is identical to the second safety switching module 102 can be mounted to the DIN rail 105 next to the second safety switching module 102 on the further connection element 110b and the still further connection element 110c. In such an example in which the second safety switching module 102 is electrically connected to the third safety switching module 103 via the further connection element 110b, the third safety switching module 103 is downstream in signal transmission to the first safety switching module 101 and the second safety switching module 102.

As previously described above, the second safety switching module 102 can thereby be deactivated in response to receiving the second control signal transmitted from the first safety switching module 101 via the connection element 110a or a control signal fed to the switching signal input 102a of the second safety switching module 102, for example a signal from a safety guard mechanism. The second safety switching module 102 is thereby configured to feed a third control signal to the third safety switching module 103 (and to do so via the further connection element 110b depicted in FIG. 1) in order to deactivate the third safety relay module 103.

The above described arrangement of the safety switching modules 101, 102, 103 of the modular safety switching apparatus 100 according to one example thereby achieves that, the second safety switching module 102 and the third safety switching module 103 can also be deactivated together with the deactivating of the first safety switching module 101, and in one example namely independently of what exact signal is fed to the switching signal input 102a of the second safety switching module 102 or to a corresponding switching signal input of the third safety switching module 103.

The arrangement according to this example further achieves that, the third safety switching module 103 is also deactivated together with the deactivating of the second safety switching module 102. According to the example, however, the functioning of the first safety switching module 101 is completely independent of the state of the second safety switching module 102 and of further safety switching modules arranged on the DIN rail 105 having the above-described basic functionality of the second safety switching module 102.

As a result of the above-described inventive arrangement of the safety switching modules 101, 102, 103 of the modular safety switching apparatus 100, it is thus possible to define a hierarchy of dependencies between the individual safety switching modules 101, 102, 103 which, in the example depicted in FIG. 1, depends on the slot on the DIN rail 105 at which a respective safety switching module 101, 102, 103 is mounted. In the example depicted in FIG. 1, the first safety switching module 101 mounted at the left end of the DIN rail 105 has the highest priority since it influences the output signal of all the safety switching modules arranged on the DIN rail 105 to its right.

FIG. 2 shows a further example of a modular safety switching apparatus 100. In the example of the modular safety switching apparatus 100 depicted in FIG. 2, the third safety switching module 103 is configured as a contact extension module. The contact extension module 103 is thereby configured to feed a feedback signal (identified as "EDM" signal in FIG. 2) to the second safety switching module 102 via the further connection element 110b, and the second safety switching module 102 is configured to feed the feedback signal to the first safety switching module 101 via connection element 110a. The contact extension module 103 can comprise a contact bridge 103f. Of course, the second safety switching module 102 can also be configured as a contact extension module instead of the third safety switching module 103.

In the example depicted in FIG. 2, the first safety switching module 101 can comprise a power supply device for operating all the safety switching modules 101, 102, 103 of the modular safety switching apparatus 100 via an external voltage source. The power supply device comprises an external supply voltage input 101d and an external reference voltage input (ground) 101e. Accordingly, the connection element 110a and the further connection element 110b can comprise a first and second internal supply voltage connection and a first and second internal reference voltage connection.

All of the features described and shown in connection with individual examples of the disclosure may be provided in different combinations in the inventive subject matter so as to simultaneously realize their advantageous effects.

LIST OF REFERENCE NUMBERS 100 modular safety switching apparatus
101 safety switching module
101a switching signal input
101b safety logic element
101c switching signal output
101d supply voltage input
101e reference voltage input
102 safety switching module
102a switching signal input
102b safety logic element
102c switching signal output
103 safety switching module
103c switching signal output
103f contact bridge
105 support element
100a-c connection elements

What is claimed is:

1. A modular safety switching apparatus for controlling a plurality of electrical devices, comprising:
a first package including a first safety switching module comprising a first switching signal input, a first safety logic element, and a first switching signal output configured to control a first electrical device, wherein a first signal path in the first package connects the first safety logic element to the first switching signal output and to a first contact pin of a first connection element, and wherein:
the first safety switching module is configured to be deactivated in response to receiving a first switching signal at the first switching signal input, wherein the first switching signal input is configured to handle one or more safety circuits coupled with the first safety logic element, and wherein the first safety logic element is configured to feed, via the first signal path and upon the first switching signal being received at the first switching signal input from an emergency stop switch, a first control signal to the first switching signal output to switch off the first electrical device connected to the first switching signal output and the first control signal to a second safety switching module to deactivate the second safety switching module;
a second package including the second safety switching module comprising a second switching signal input, a second control signal input, a second feedback signal input, a second safety logic element, and a second switching signal output configured to control a second electrical device, wherein a second signal path in the second package connects the second control signal input to a second contact pin of the first connection element that corresponds to the first contact pin of the first connection element, and a third signal path in the second package connects the second safety logic element to the second switching signal output and to a third contact pin of a second connection element, and wherein:
the second safety switching module is downstream in signal transmission to the first safety switching module, wherein the second safety switching module is further configured to deactivate in response to receiving either one of the first control signal from the first safety switching module at the second control signal input via the second signal path, a second switching signal at the second switching signal input, or a feedback signal at the second feedback signal input from a third safety switching module, wherein the second safety switching module is deactivated regardless of which signal is fed to the second safety switching module, and wherein the second safety logic element is configured to feed, via the third signal path and upon the second switching signal being received at the second switching signal input from the emergency stop switch, a second control signal to the second switching signal output to switch off the second electrical device connected to the second switching signal output and the second control signal to the third safety switching module to deactivate the third safety switching module;
a third package including the third safety switching module comprising a third switching signal output configured to control a third electrical device, wherein the third safety switching module is downstream in signal transmission to the first safety switching module and the second safety switching module, and wherein the third safety switching module is further configured to feed the feedback signal to the second safety switching module and to deactivate in response to receiving the second control signal from the second safety switching module; and
a support element, wherein:
the first connection element and the second connection element are attached to the support element,
the first connection element is configured to detachably connect the first package and the second package to the first connection element and configured to electrically connect the first safety logic element of the first package to the second safety logic element of the second package, and
the second connection element is configured to detachably connect the second package to the second connection element and the third package to the second connection element and configured to electrically connect the second safety logic element of the second package to the third switching signal output of the third package, and wherein the third safety switching module is configured to feed the feedback signal to the second safety switching module via the second connection element, and the second safety switching module is configured to feed the feedback signal to the first safety switching module via the first connection element.

2. The modular safety switching apparatus according to claim 1, wherein the second safety switching module is arranged on the support element between the first safety switching module and the third safety switching module.

3. The modular safety switching apparatus according to claim 1, wherein the first connection element is part of the first safety switching module or the second safety switching module, and the second connection element is part of the second safety switching module or the third safety switching module.

4. The modular safety switching apparatus according to claim 1, wherein the second safety switching module or the third safety switching module is configured as a contact extension module.

5. The modular safety switching apparatus according to claim 4, wherein the third safety switching module is configured as the contact extension module.

6. The modular safety switching apparatus according to claim 4, wherein the contact extension module comprises a contact bridge.

7. The modular safety switching apparatus according to claim 1, wherein the first safety logic element comprises a control signal output, and wherein the first connection element is configured to electrically connect the control signal output of the first safety switching module to the second control signal input of the second safety switching module.

8. The modular safety switching apparatus according to claim 7, wherein the second safety logic element is configured to link the first control signal fed to the first switching signal output to the second switching signal fed to the second switching signal input by means of a logical AND operation or a logical OR operation to generate the second control signal to be fed to the second switching signal output.

9. The modular safety switching apparatus according to claim 1, wherein the first control signal is of a single-channel physical form or a dual-channel physical form.

10. The modular safety switching apparatus according to claim 1, wherein one of the first safety switching module or the second safety switching module comprises a power supply device to supply voltage to the first safety switching module, the second safety switching module, and the third safety switching module of the modular safety switching apparatus.

11. The modular safety switching apparatus according to claim 10, wherein the power supply device comprises an external supply voltage input and an external reference voltage input.

12. The modular safety switching apparatus according to claim 10, wherein the first safety switching module comprises the power supply device.

13. The modular safety switching apparatus according to claim 1, wherein the first connection element comprises a first internal supply voltage connection and a second internal supply voltage connection and a first internal reference voltage connection and a second internal reference voltage connection.

14. The modular safety switching apparatus according to claim 1, wherein the support element comprises a DIN rail.

15. The modular safety switching apparatus according to claim 1, wherein the first connection element comprises a first set of contact pins including the first contact pin and a second set of contact pins including the second contact pin, wherein:
a first portion of the first connection element comprises the first set of contact pins and is configured to be introduced into a first sleeve of the first package to detachably connect the first package to the first connection element,
a second portion of the first connection element comprises the second set of contact pins and is configured to be introduced into a first sleeve of the second package to detachably connect the second package to the first connection element, and
the first connection element is configured to electrically connect the first safety logic element of the first package to the second safety logic element of the second package based at least in part on the first portion of the first connection element being introduced into the first sleeve of the first package and the second portion of the first connection element being introduced into the first sleeve of the second package.

16. The modular safety switching apparatus according to claim 15, wherein the second connection element comprises a third set of contact pins including the third contact pin and a fourth set of contact pins, wherein:
a first portion of the second connection element comprises the third set of contact pins and is configured to be introduced into a second sleeve of the second package to detachably connect the second package to the second connection element,
a second portion of the second connection element comprises the fourth set of contact pins and is configured to be introduced into a first sleeve of the third package to detachably connect the third package to the second connection element, and
the second connection element is configured to electrically connect the second safety logic element of the second package to the third safety switching module of the third package based at least in part on the first portion of the second connection element being introduced into the second sleeve of the second package and the second portion of the second connection element being introduced into the first sleeve of the third package.

17. The modular safety switching apparatus according to claim 1, wherein the third safety switching module comprises a fourth signal path configured to carry an external supply voltage signal used for the first safety logic element and the second safety logic element and a fifth signal path that comprises one or more switches and is configured to feed the feedback signal back to the second safety logic element, the modular safety switching apparatus, further comprising:
a contact bridge coupled with the fourth signal path and the fifth signal path, wherein the one or more switches are configured to be activated and the fourth signal path is configured to feed the external supply voltage signal back to the second safety logic element as the feedback signal based at least in part on a state of the third switching signal output.

18. A method for controlling a plurality of electrical devices, comprising:
controlling, by a first switching signal output, a first electrical device of a first safety switching module that comprises a first switching signal input, a first safety logic element, and the first switching signal output, wherein a first signal path in a first package comprising the first safety switching module connects the first safety logic element to the first switching signal output and to a first contact pin of a first connection element, and wherein the first switching signal input is configured to handle one or more safety circuits coupled with the first safety logic element;

controlling, by a second switching signal output, a second electrical device of a second safety switching module that comprises a second switching signal input, a second control signal input, a second feedback signal input, a second safety logic element, and the second switching signal output, wherein a second signal path in a second package comprising the second safety switching module connects the second control signal input to a second contact pin of the first connection element that corresponds to the first contact pin of the first connection element, and a third signal path in the second package connects the second safety logic element to the second switching signal output and to a third contact pin of a second connection element;

controlling, by a third switching signal output, a third electrical device of a third safety switching module;

electrically connecting the first safety switching module to the second safety switching module at the first connection element, wherein the first safety switching module and the second safety switching module are detachably connected to the first connection element and the second safety switching module is downstream in signal transmission to the first safety switching module, and wherein safety logic of the second safety switching module is based at least in part on a state of the first safety switching module;

electrically connecting the second safety switching module to the third safety switching module at the second connection element, wherein the second safety switching module is detachably connected to the second connection element and the third safety switching module is downstream in signal transmission to the first safety switching module and the second safety switching module;

receiving a first switching signal at the first safety switching module;

deactivating the first safety switching module based on receiving the first switching signal;

feeding a first control signal from the first safety switching module to the second control signal input of the second safety switching module to deactivate the second safety switching module;

feeding the first control signal from the first safety logic element to the first switching signal output upon the first switching signal being received at the first switching signal input from an emergency stop switch in order to switch off the first electrical device connected to the first switching signal output;

receiving, at the second switching signal input, either one of the first control signal, a second switching signal, or a feedback signal;

deactivating the second safety switching module in response to receiving either one of the first control signal, the second switching signal, or the feedback signal along with deactivating the first safety switching module regardless of which signal is fed to the second switching signal input of the second safety switching module;

feeding a second control signal from the second safety logic element to the second switching signal output upon a switching signal being fed to the second switching signal input from the emergency stop switch in order to switch off the second electrical device connected to the second switching signal output;

feeding the second control signal from the second safety switching module to the third safety switching module to deactivate the third safety switching module;

receiving the second control signal at the third safety switching module;

deactivating the third safety switching module based on receiving the second control signal;

feeding the feedback signal from the third safety switching module to the second safety switching module via the second connection element; and feeding the feedback signal from the second safety switching module to the first safety switching module via the first connection element.

* * * * *